Sept. 27, 1960 K. R. CARPENTER ET AL 2,954,502

DEFLECTION CIRCUIT FOR CATHODE RAY TUBES

Filed Nov. 10, 1958

INVENTORS K. R. CARPENTER
R. F. LANE
R. C. NEWHOUSE

BY J. P. Kearns, Jr.
ATTORNEY

United States Patent Office 2,954,502

Patented Sept. 27, 1960

2,954,502

DEFLECTION CIRCUIT FOR CATHODE RAY TUBES

Keith R. Carpenter, Mendham, Richard F. Lane, Springfield, and Russell C. Newhouse, Short Hills, N.J., assignors to Bell Telephone Laboratories, Incorporated, New York, N.Y., a corporation of New York Filed Nov. 10, 1958, Ser. No. 772,760

5 Claims. (Cl. 315—26)

Figure 2:
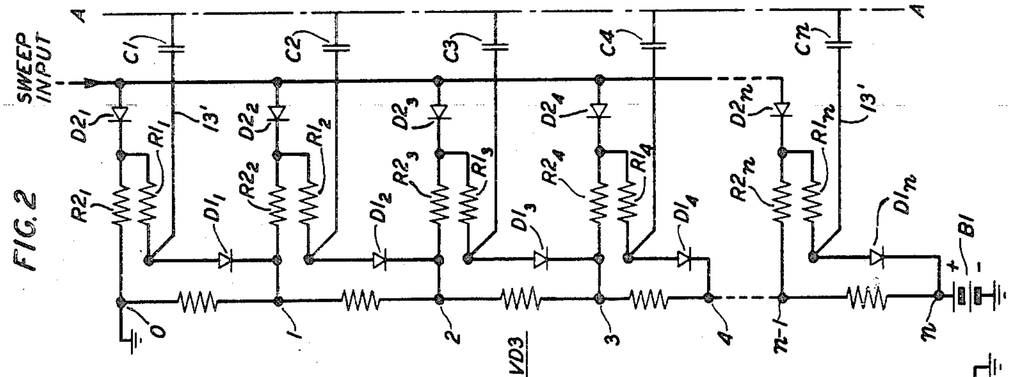

This invention relates to cathode ray tube deflecting systems, and specifically to an improved circuit employing transistors for producting an electromagnetic deflection field for a cathode ray tube.

In United States Patent No. 2,821,657, issued to R. C. Newhouse on January 28, 1958, there is disclosed an electromagnetic deflection circuit for a cathode ray tube employing transistors. In that system each deflection axis of the deflection coil assembly arranged around the neck of the cathode ray tube is divided into a plurality of discrete, linearly wound coil segments, each of which is driven by an individual transistor amplifier supplied with a sawtooth wave derived from a common horizontal or vertical axis deflection generator. The common sawtooth wave is supplied through individual signal dividing means such that each amplifier is supplied with a voltage or current wave of a preselected magnitude relative to that supplied to the other amplifiers. The relative proportions of the common sawtooth wave are selected so that a composite electromagnetic deflection field is produced by the complete coil assembly for deflecting the electron beam across the face of a cathode ray tube in both orthogonal directions. While all transistors and coil segments may be identical as in one embodiment described in the patent, the amplitude of the deflection current differs among the several transistors and coil segments because of the division of the common sawtooth wave. Moreover, the maximum collector power dissipation occurs in all transistors at the same time as the driving waves build up to maximum amplitude. As a consequence the several transistors and coil segments are non-uniformly driven, and some transistors and coil segments more heavily than others, thus making certain portions of the circuit liable to early breakdown because of uneven heat dissipation.

It is an object of this invention to improve electromagnetic deflection systems of the segmented coil type.

It is a further object to simplify cathode ray tube deflection systems by making it possible to produce an arbitrary deflection characteristic by the adjustment of passive circuit elements only.

It is another object to achieve a more uniform distribution of heat among the collectors of the several individual transistors driving segmented coils in an electromagnetic deflection system.

In accordance with the present invention the heat dissipation of the several transistors and coil segments of a segmented coil deflection system is caused to be more evenly distributed and reduced in magnitude by dividing the common sawtooth driving wave for each of the perpendicular deflection axes on a time basis rather than on an amplitude basis with the result that each transistor amplifier and coil segment is driven to substantially the same amplitude but at different time intervals.

It is a feature of the invention that the heat dissipation in a segmented coil deflection system is reduced in each of the several coil segments and the amplifiers driving these segments substantially more than in prior art systems. It is another feature that the design flexibility of a cathode ray deflection system is improved without the necessity of altering the deflection coil assembly which may therefore be constructed of a plurality of uniformly wound coil segments.

Figure 1:
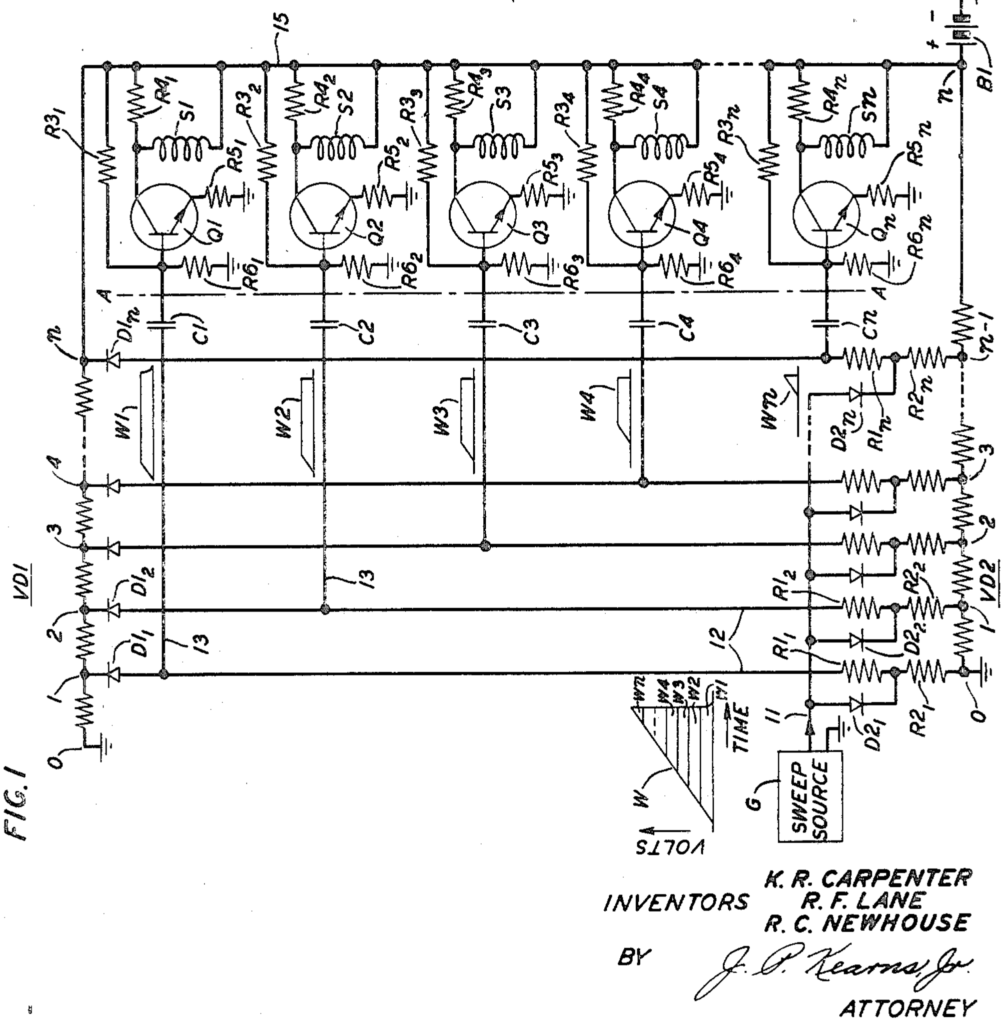

Other objects and features of the invention will become apparent from a consideration of the following description and the accompanying drawing, in which:

Fig. 1 is a schematic diagram of a cathode ray tube deflection system for one coordinate axis of deflection according to the invention; and Fig. 2 is a modification of the deflection system shown in Fig. 1.

Referring now to Fig. 1, a sweep signal source G supplies a voltage for deflecting the beam of a cathode ray tube (not shown) across the screen thereof in the horizontal direction, for example. Deflection of the beam in the vertical direction may be arranged in a similar circuit for driving the vertical deflection coils. Let it be assumed that a linear deflection system is illustrated. Then the waveform of voltage supplied by sweep source G is of the form shown as wave shape W just above the sweep source G in Fig. 1. The ordinate represents voltage amplitude and the abscissa, time. The varying voltage of waveform W is applied over input line 11 to an amplitude discriminator circuit comprising a first voltage divider VD1 and a second voltage divider VD2, each including a plurality of series-connected resistors disposed as a group in parallel across a common direct-current potential source B1; a first plurality of diodes $D1_1$ through $D1_n$ having their cathodes connected to the several junction points between successive resistors of voltage divider VD1 and their anodes connected to a plurality of load resistors $R1_1$ through $R1_n$; a second plurality of diodes $D2_1$ through $D2_n$ having their anodes connected to input line 11 and their cathodes connected by way of a plurality of load resistors $R2_1$ through $R2_n$ to the junction points between successive resistors of voltage divider VD2.

For a linear system for deflecting an electron beam along one or the other coordinate axes, as assumed above, each of the voltage dividers VD1 and VD2 is composed of resistors of identical value so that the voltage appearing across each individual resistor is an equal part of the voltage of direct-current source B1. For example, voltage at the left-hand end of voltage divider VD1 is zero or ground and at each junction point on the divider to the right of the zero point is progressively one unit higher as the voltage of point 1 is one unit above ground; point 2 is two units above ground; and so forth. Similarly, the voltage at the left-hand end of divider VD2 is zero and becomes progressively higher unit by unit to the right of the ground point as indicated by the digits 1, 2, . . . . *n*. Inasmuch as voltage dividers VD1 and VD2 are assumed to be composed of identical resistors, the unit voltage increments on each divider are of the same value.

Load resistors $R1_1$ through $R1_n$ have common junction points with load resistors $R2_1$ through $R2_n$, to which the anodes of diodes $D2_1$ through $D2_n$ are also joined. The anodes of diodes $D1_1$ through $D1_n$ further connect to a plurality of output lines designated 13. The two diode series D1 and D2 are so poled that no current flows in the absence of an input from sweep source G, but each diode is connected to a point on the respective voltage dividers VD1 and VD2 at successively higher voltage levels. Thus, the left-hand diode D1 is biased one unit above ground potential and the left-hand diode D2 is biased at ground potential. Therefore, as the voltage wave W increases above zero volts, left-hand diode D2 begins to conduct and a linearly increasing voltage is developed across load resistor R2. The voltage across resistor R2 increases until it is one unit in amplitude, at which time the left-hand diode D1 is caused to conduct. The voltage on line 12 then can rise no higher and the resulting voltage wave appearing on outgoing line 13 may be represented by the waveform W1. However, at the time the voltage on input line 11 rises to one unit the next diode D2 conducts and a voltage appears on the next lines 12 and 13. The voltage on the second line 13 continues to increase along with the input wave until the next diode D1 conducts and a voltage as shown in waveform W2 appears on the corresponding outgoing line 13. The lower voltage on waveform W2 is one unit above ground and the upper voltage is two units above ground.

As the input voltage further increases, successive diodes D2 conduct to channelize a portion of the input wave to successive lines 13 and subsequently successive diodes D2 conduct to fix the upper bound of the voltage applied to the lines 13. Consequently contiguous wavesforms W2, W3, . . . $W_n$ are successively developed. In effect the input wave is sliced into individual waveforms, each one unit in amplitude, for application to successive lines 13. It is evident that the maximum amplitude of the input sawtooth wave W should be *n* units to correspond to the voltage of potential source B1.

Each of the horizontal and vertical deflecting portions of the deflection coil assembly for the cathode ray tube is composed of individual, identical, linearly wound segments S1, S2, . . . $S_n$ and each segment is driven by an individual transistor amplifier Q1, Q2, . . . $Q_n$. The individual segments S may form either orthogonal part of a complete deflection yoke assembly adapted to being fitted around the neck of a cathode ray tube between the electron gun and the face plate in the normal manner. The driving amplifiers are identical and comprise n-p-n or p-n-p transistor types to obtain the advantages of low-power drain, low heat generation and small space requirements characteristic of transistors. Vacuum tube amplifiers could, of course, be used, but transistors, being essentially low impedance devices additionally facilitate coupling directly to the coil segments without the impedance-matching transformers required with vacuum tubes. All polarities shown in the drawing correspond to the assumption that p-type transistors are being used. However, it will be obvious to one skilled in the art that if n-type transistors are to be used, all polarities must be reversed.

Each of the coil segments S1 through $S_n$ is connected at one end to the common lead 15 which extends to potential source B1 and the other end to the collector electrode of one of the transistor amplifiers. A resistor R4 is shunted across each coil segment for the purpose of damping the transient currents arising in the coil segments at the termination of the sweep current. Resistors $R4_1$ through $R4_n$ are of such value that substantially all the collector current flows through the coil segment during the driving stroke.

Each of the transistors Q1 through $Q_n$ is connected as a grounded emitter amplifier, the emitter electrodes indicated by the arrowhead being grounded through resistors $R5_1$ through $R5_n$. The presence of resistor R5 in the emitter circuit of each transistor provides feedback stabilization in a well-known manner. Cut-off bias is afforded each transistor by the voltage divider comprising resistors R3 and R6 in series across the potential source B1. The junction of resistors R3 and R6 is connected to the base of the transistor. In the absence, therefore, of an input signal, only the small steady $I_{co}$ current is drawn by the collector of each transistor and the coil segments generate a negligible deflection field.

Each of the transistors Q1 through $Q_n$ has its base electrode further coupled by the particular coupling capacitor C1 through $C_n$ to one of the leads 13 on which the sliced sweep voltages from the channelizer circuit appear.

As the waves W1 through $W_n$ are applied successively to the base electrodes of transistors Q1 through $Q_n$, the transistors are caused to conduct and a small part of the cathode ray tube deflection field is generated in each coil segment S1 through $S_n$ in turn. The individual contribution of each coil segment is integrated in the magnetic field produced thereby to form a composite deflection field in accordance with the leading edges of the wave W1 through $W_n$. However, no transistor is driven into saturation, and all are subjected to the same maximum voltage amplitude at the base electrode. Before conduction, the collector current of each transistor is the low $I_{co}$ current previously mentioned and the heat generated is therefore negligible. During the time that each of the separate sweep signals is increasing, the collector heat generation is the product of the voltage and the current, which is the same for each transistor, and since in each case the time of the increasing signal portion is short, the heat dissipation is not excessive. After the sweep signal has reached its maximum value, the heat dissipation of the collector is again reduced because the collector voltage is reduced. It is apparent that the heat dissipation of each transistor is reduced to the minimum and each transistor further dissipates a nearly uniform amount of heat with no transistor being overloaded, even though the length of time during which each transistor is drawing current is progressively less as the sweep signal increases in amplitude. Heat is generated mainly on the increasing portion of the sweep signal and this is uniform from transistor to transistor in the case of a linear sweep.

If it should be desired to produce other than a linear sweep deflection field, it is immediately obvious that a non-linear field can be produced readily by either changing the waveform W1 of the sweep source G, or adjusting the values of the resistors making up the voltage dividers. In the latter case a linear sweep source signal may continue to be used. In neither case is any alteration of the coil segments S1 through $S_n$ required.

A further simplification of the amplitude discriminator or slicing circuit may be effected by combining the two voltage dividers VD1 and VD2 shown in Fig. 1 to the left of line A—A into a single voltage divider VD3 across the potential source B1 as shown in Fig. 2. Here the resistors located between points 0, 1; 1, 2; and so forth are chosen to produce the same direct-current voltages at points 1, 2, . . . *n* in voltage divider VD3 as the correspondingly numbered points in voltage dividers in VD1 and VD2 in Fig. 1. Diodes $D1_1$ through $D1_n$ and $D2_1$ through $D2_n$ perform the same functions as the similarly designated diodes in Fig. 1. Load resistors $R1_1$ through $R1_n$ associated with diodes $D1_1$ through $D1_n$ which determine the upper limiting voltage for each slice are similarly in series between the diodes and a junction point on voltage divider VD3. Likewise, load resistors $R2_1$ through $R2_n$ associated with diodes $D2_1$ through $D2_n$ are in series with the diodes and a point on the voltage divider VD3 one unit below the junction point to which the diodes D1 are connected. The junction point between diodes $D1_1$ through $D1_n$ and resistors $R1_1$ through $R1_n$ are brought out on leads 13′ to serve as inputs through the respective capacitors C1 through $C_n$ to the several driving amplifiers. If the circuit of Fig. 2 is substituted in Fig. 1 for the circuitry to the left of the dashed line A—A, the same circuit operation will be obtained as described above in connection with Fig. 1.

While the features of this invention have been described with reference to a single embodiment in terms of a linear deflection system, it is to be understood that the invention is not intended to be so limited. The direction of sweeping the electron beam across the face of the cathode ray tube may be changed dependent on the orientation of the coil segments S1 through $S_n$ relative to the electron beam. Further, a non-uniform beam deflection can be obtained by replacing sweep source G with a source having the appropriate waveform or the amplitude slicing arrangement may be replaced by a plurality of separate sweep sources of fixed phase difference, one for each coil segment, to produce any desired deflection field of arbitrary waveform.

What is claimed is:

1. In a system for deflecting the electron beam of a cathode ray tube, a deflection coil assembly comprising a plurality of coil segments for deflecting said beam along one coordinate axis of said tube, a plurality of individual amplifiers one being coupled to each of said coil segments, a sawtooth wave generator for driving said plurality of coil segments, means associated with said generator for dividing the output wave thereof into a plurality of equal amplitude slices according to the number of coil segments in said plurality thereof, and means for applying said wave slices in a proper phase to said plurality of amplifiers whereby a composite magnetic deflection field is built up in said deflection coil assembly in accordance with the output waveform of said generator.

2. The system of claim 2 in which each of said dividing means comprises one each of a first and second plurality of differently biased rectifiers, one each of a first and second plurality of load resistors for each of said rectifiers, and a plurality of output lines connected to said load resistors and serving to supply said wave slices to said individual amplifiers.

3. In a system for deflecting the electron beam of a cathode ray tube along one coordinate axis, a deflection coil assembly comprising a plurality of like discrete segments, an amplifier driving each of said segments, a source of deflection voltage, means for channelizing the output wave from said source into a plurality of contiguous amplitude ranges of preselected upper and lower limits, and means for supplying the portion of the deflection voltage lying in each of said amplitude ranges to an individual one of said amplifiers.

4. In a system for generating an electromagnetic field to interact with and thereby deflect the electron beam of a cathode ray tube, a source of deflecting voltage, means for dividing the output wave of said source into a plurality of contiguous portions of like amplitude, a transistor amplifier for each of said portions including an input and an output circuit, means for applying said wave portions to the input circuits of said amplifiers, a plurality of coils arranged to produce collectively an electromagnetic field for deflecting said electron beam, and means for coupling the output circuits of said amplifiers to said coils.

5. In a deflection system for a cathode ray tube including a deflection coil divided into a plurality of segments, a source of sawtooth sweep voltage, means comprising a plurality of pairs of differently biased rectifiers for dividing the sweep voltage into a plurality of portions having uniform amplitudes but different time durations, a plurality of individual transistor amplifiers for amplifying the respective discrete sweep voltage portions, and circuit means for so connecting the outputs of the respective rectifier pairs through said transistor amplifiers to said coil segments that each of said last-mentioned amplifiers amplifies the voltage portion derived through one rectifier pair and supplied to one coil segment and thereby provides a desired electromagnetic deflection field for said tube.

References Cited in the file of this patent

UNITED STATES PATENTS

| | | |
|---|---|---|
| 2,512,639 | Gohorel | June 27, 1950 |
| 2,556,200 | Lesti | June 12, 1951 |
| 2,563,589 | Hertog | Aug. 7, 1951 |
| 2,612,550 | Jacobi | Sept. 30, 1952 |
| 2,618,753 | Van Mierlo | Nov. 18, 1952 |
| 2,688,441 | Merrill | Sept. 7, 1954 |
| 2,821,657 | Newhouse | Jan. 28, 1958 |